United States Patent
Sandor et al.

(10) Patent No.: US 6,469,135 B2
(45) Date of Patent: Oct. 22, 2002

(54) PREPARATION OF POLYMER POWDERS

(75) Inventors: Mario Sandor, Obrigheim; Joachim Pakusch, Speyer; Heinrich Sack, Hassloch; Markus Koppers, Maxdorf; Hans-Jürgen Denu, Friedelsheim; Rolf Gulden, Frankenthal, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/932,932

(22) Filed: Aug. 21, 2001

(65) Prior Publication Data

US 2002/0062006 A1 May 23, 2002

(30) Foreign Application Priority Data

Aug. 21, 2000 (DE) .......................................... 100 40 826

(51) Int. Cl.$^7$ .................................................. C08F 6/00
(52) U.S. Cl. ...................................................... 528/480
(58) Field of Search .......................................... 528/480

(56) References Cited

U.S. PATENT DOCUMENTS 5,225,478 A    7/1993   Beckerle et al. ............ 524/510

FOREIGN PATENT DOCUMENTS

| EP | 407 889 | 7/1993 |
| WO | WO 98/03576 | 1/1998 |
| WO | WO 98/03577 | 1/1998 |

*Primary Examiner*—Terressa M. Boykin
(74) *Attorney, Agent, or Firm*—Oblon, Spivak, McClelland, Maier & Neustadt, P.C.

(57) ABSTRACT

The present invention provides a process for preparing polymer powders by evaporating the volatile constituents from aqueous dispersions of film-forming polymers P in the presence of drying assistants T selected from the salts of oligomeric arylsulfonic acid-formaldehyde condensates wherein prior to the evaporation of the volatile constituents the aqueous polymer dispersion comprises at least 1.5% by weight, preferably at least 1.7% by weight, based on the polymer in the dispersion, of at least one anionic surface-active compound AO having at least one $C_6$–$C_{32}$ alkyl group; the polymer powders obtainable by the process; and their use in binding mineral building materials.

34 Claims, No Drawings

PREPARATION OF POLYMER POWDERS

DESCRIPTION

The present invention relates to a process for preparing polymer powders by evaporating the volatile constituents from aqueous dispersions of film-forming polymers P in the presence of drying assistants T selected from the salts of oligomeric arylsulfonic acid-formaldehyde condensation products. It also relates to the polymer powders obtainable by this process and to their use.

Aqueous dispersions of film-forming polymers find broad application as, for example, binders, especially for synthetic resin plasters or highly pigmented interior paints, adhesives or coating compositions. Frequently, however, what is desired is to use not the aqueous polymer dispersion itself but rather the polymer present therein in powder form.

To obtain the film-forming polymer in powder form, the dispersion is subjected to a drying operation in which the volatile constituents of the dispersion are evaporated by a suitable method, for example, by means of spray or freeze drying. It is necessary to bear in mind that during the evaporation of the aqueous dispersion medium the polymer particles of the aqueous dispersion aggregate irreversibly and may form secondary particles. Secondary particle formation leads to a coarsening of the polymer powder, resulting in poorer redispersibility, generally associated with poorer performance properties of the powder. Moreover, it leads to the formation of deposits on the dryer walls and so reduces the powder yield.

In order to prevent or at least reduce the irreversible formation of secondary particles during powder preparation, drying assistants are used. They are frequently referred to also as spraying assistants, since spray drying in particular promotes the formation of irreversibly agglomerated secondary particles. This effect becomes more pronounced the lower the glass transition temperature (and thus the softening temperature or minimum film-forming temperature) of the polymer particles, especially when it is below the drying temperature.

At the same time, drying assistants generally reduce the formation of polymer deposits which remain adhering to the dryer wall, and so bring about an increase in the powder yield.

Drying assistants which are frequently used, not least owing to their favorable price, are the salts, preferably the alkali metal, alkaline earth metal or ammonium salts, of condensation products of aromatic sulfonic acids with formaldehyde (arylsulfonic acid-formaldehyde condensates).

DE-A-24 45 813 describes a pulverulent polymer, redispersible in aqueous systems, which comprises as drying assistant from 1 to 20% by weight of a water-soluble condensate of aromatic hydrocarbons and formaldehyde that contains sulfonic acid or sulfonate groups, examples being phenolsulfonic or naphthalenesulfonic acid-formaldehyde condensates.

WO 98/03577 discloses salts of naphthalenesulfonic acid-formaldehyde condensates having a number average molecular weight $M_n$ of less than 1500 daltons which possess particularly good spraying assistant properties.

Similarly, EP-A-407 889 describes the use of a water-soluble alkali metal or alkaline earth metal salt of a phenolsulfonic acid-formaldehyde condensate as a spraying assistant for preparing water-redispersible addition polymer powders.

WO 98/03576 likewise discloses salts of phenolsulfonic acid-formaldehyde condensates which have a number average molecular weight $M_n$ of less than 1500 daltons and possess particularly good spraying assistant properties.

The use of drying agents, especially arylsulfonic acid-formaldehyde condensates, nevertheless has the disadvantage that the film formation of the powder particles in the redispersed state, which is necessary for the application, is adversely affected.

It is an object of the present invention to provide a process for preparing polymer powders which uses drying assistants based on oligomeric arylsulfonic acid-formaldehyde condensates to give polymer powders having better film-forming properties.

We have found that this object is achieved by a process in which the powder is prepared from an aqueous polymer dispersion comprising not only the oligomeric arylsulfonic acid-formaldehyde condensates but also at least 1.5% by weight, based on the polymer in the dispersion, of at least one anionic surface-active compound AO which has at least one $C_6$–$C_{32}$ alkyl group.

The present invention accordingly provides a process for preparing polymer powders by evaporating the volatile constituents from aqueous dispersions of film-forming polymers P in the presence of drying assistants T selected from the salts of oligomeric arylsulfonic acid-formaldehyde condensates wherein prior to the evaporation of the volatile constituents the aqueous polymer dispersion comprises at least 1.5% by weight, preferably at least 1.7% by weight, based on the polymer in the dispersion, of at least one anionic surface-active compound AO having at least one $C_6$–$C_{32}$ alkyl group.

Film-forming denotes that when the water is evaporated (during drying) the polymer particles of the aqueous dispersion or the powder particles in an aqueous redispersed preparation coalesce above a temperature specific to them, the minimum film-forming temperature MFT, and form a coherent polymer film. Aqueous redispersed preparation denotes an aqueous dispersion of the polymer powder.

In general, the amount of the anionic surface-active compound AO, based on the polymer in the dispersion, will not exceed 10% by weight and preferably will not exceed 5% by weight. In particular, the amount is in the range from 1.5 to 4% by weight and with particular preference in the range from 1.7 to 3% by weight.

Compounds AO suitable in accordance with the invention are salts of those compounds which have at least one $C_6$–$C_{32}$ alkyl group, in particular a $C_8$–$C_{22}$ alkyl group, and a functionality suitable for salt formation with a base, e.g., a carboxylate, sulfonate, phosphonate, phosphate or sulfate group, preferably a sulfonate group. Preferred salts have alkali metal, alkaline earth metal or ammonium counterions and especially sodium, potassium or calcium counterions. Sodium salts are particularly preferred. Such compounds are also known from the prior art as anionic emulsifiers; see, for example, Houben-weyl, Methoden der organischen Chemie, Volume XIV/1, Makromolekulare Stoffe [Macromolecular substances], Georg-Thieme-Verlag, Stuttgart, 1961, pp. 192–208.

Hereinbelow, the expressions $C_n$–$C_m$ relate to the number of carbons of a respective class of compound that is possible in the context of the invention. Alkyl groups may be linear or branched. $C_n$–$C_m$ alkylaryl stands for aryl groups which carry a $C_n$–$C_m$ alkyl radical.

Examples of suitable compounds AO are salts of alkyl sulfates derived from linear or branched alcohols, e.g., fatty alcohols or oxo alcohols (alkyl: $C_8$–$C_{32}$), of sulfuric monoesters with ethoxylated alkanols derived from linear or branched alcohols, e.g., fatty alcohols or oxo alcohols (EO units: 2 to 50, alkyl: $C_8$ to $C_{32}$), of sulfuric monoesters with ethoxylated alkylphenols having a preferably linear alkyl radical (EO units: 2 to 50, alkyl: $C_6$–$C_{22}$), of alkylsulfonic acids (alkyl: $C_6$–$C_{32}$), of dialkyl esters of sulfosuccinic acid (alkyl: $C_6$ to $C_{32}$) and of alkylarylsulfonic acids with a preferably linear alkyl radical (alkyl: $C_6$ to $C_{32}$). Suitable anionic emulsifiers are also the salts of the di($C_6$–$C_{32}$ alkyl) derivatives of bis(phenylsulfonyl) ether and the technical mixtures thereof which are in commerce, for example, as DOWFAX® 2A1 from DOW Chemical Co.

Preferred compounds AO are the compounds of the formula I,

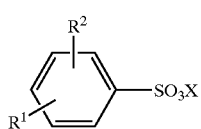

(I)

in which
  $R^1$ is a $C_6$–$C_{32}$ alkyl and preferably a $C_8$–$C_{22}$ alkyl group,
  $R^2$ is hydrogen, $C_1$–$C_4$ alkyl, a fused benzene ring unsubstituted or substituted by $C_1$–$C_4$ alkyl, or is a phenoxy radical with or without a $C_6$–$C_{32}$ alkyl group and/or a sulfonate group, and
  X is a cation equivalent and is preferably an alkali metal cation, especially a sodium or potassium ion, is one equivalent of an alkaline earth metal cation, especially ½ $Ca^{2+}$, or is an ammonium ion.

With particular preference, $R^2$ in formula I is hydrogen. With particular preference, $R^1$ is attached para to the sulfonate group.

Preferred compounds also include the abovementioned salts of alkylsulfonic acids in which the alkyl group has 6 to 32 and preferably 10 to 20 carbon atoms ($C_6$–$C_{32}$ and $C_{10}$–$C_{20}$ alkylsulfonates, respectively). The alkyl radical in the alkylsulfonates may be linear or branched. The sulfonate group may be positioned, for example, on the terminal carbon atom, its vicinal carbon atom, or on another carbon atom of the alkyl radical.

Preferred compounds AO further include the salts of bis-$C_6$–$C_{32}$ alkyl esters and especially bis-$C_6$–$C_{32}$ alkyl esters of saturated, sulfonated dicarboxylic acids having 3 to 10 carbon atoms, e.g. compounds of the formula II

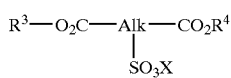

(II)

in which $R^3$ and $R^4$ independently of one another are a linear or branched alkyl radical having 6 to 32 and preferably 6 to 24 and especially 6 to 12 carbon atoms; Alk is a $C_1$–$C_8$ alkylene group or a $C_5$–$C_8$ cycloalkylene group, and X is as defined above.

Alkylene in this context is a bivalent, aliphatically saturated hydrocarbon radical, e.g. methylene, 1,2-ethylene, 1,2- or 1,3-propylene (propanediyl), 1,2-, 1,3-, 2,3- or 1,4-butylene (butanediyl), 1,2-, 1,3-, 2,3-, 1,4- or 1,5-pentylene (pentadiyl), 1,6-hexylene (hexanediyl) and the like.

Cycloalkylene here is a bivalent, saturated cycloaliphatic radical, e.g. 1,2-, 1,3- or 1,4-cyclohexanediyl.

Preferably, Alk is 1,2-ethylene. In this case the compounds of the formula II comprise the salts of bis-$C_6$–$C_{32}$ alkyl esters of sulfosuccinic acid. Among the compounds of the formula II, the bis-$C_6$–$C_{10}$ and especially the bis-$C_6$–$C_{12}$ alkyl esters of sulfosuccinic acid are preferred. Examples thereof are the salts, especially the sodium salts of bis-n-octyl sulfosuccinate, of bis-iso-octylsulfosuccinate and of bis-(2-ethylhexyl) sulfosuccinate.

The compound AO may be added during the drying operation, or preferably beforehand, to the polymer dispersion to be dried. Some or all of AO may also be added during the preparation of the aqueous polymer dispersion and, where the preparation takes place by free radical aqueous emulsion polymerization, may be used as an emulsifier for the monomer emulsion to be polymerized. Preferably at least 1% by weight of AO, based on the polymer, or at least ⅔ and in particular at least ¾ of the total amount of AO, is added to the aqueous polymer dispersion following its preparation. The compounds added are preferably the compounds AO with sulfonate groups stated as being preferred.

In addition to the abovementioned compounds AO, the polymer dispersion used in the process of the invention may also comprise nonionic surface-active compounds (nonionic emulsifiers).

Preferred nonionic emulsifiers are araliphatic emulsifiers, examples being ethoxylated mono-, di- and trialkylphenols (EO units: 3 to 50, alkyl: $C_6$–$C_{32}$), or aliphatic emulsifiers based on alkyl-substituted aromatics, examples being ethoxylates of long-chain alcohols, e.g., of oxo alcohols or fatty alcohols (EO units: 3 to 50, alkyl: $C_8$–$C_{32}$). These emulsifiers may be present in the polymer dispersion in amounts of up to 10% by weight, preferably up to 4% by weight, and in particular up to 2% by weight, e.g., from 0.1 to 10, preferably from 0.1 to 4% by weight and in particular from 0.2 to 2% by weight.

The salts of arylsulfonic acid-formaldehyde condensates that are used in the process of the invention as drying assistants T are known from the prior art, for example, from the documents cited at the outset, which are hereby fully incorporated by reference.

Among these salts, preference is given to the salts of arylsulfonic acid-formaldehyde condensates, especially of naphthalenesulfonic acid-formaldehyde condensates, which have a number average molecular weight $M_n$ of less than 1500 daltons, in particular in the range from 600 to 1200 daltons. These preferred drying assistants T are disclosed in WO 98/03577 and WO 98/03756, which are incorporated by reference. The polydispersity (defined as $M_w/M_n$) of these preferred drying assistants T is preferably in the range from 5 to 15 and in particular in the range from 5 to 11. The fraction of condensates having molar masses of more than 10,000 daltons in these preferred drying assistants is preferably less than 25% by weight, in particular less than 20% by weight of the total condensate. The molecular weight stated here refers in this context to weights determined by gel permeation chromatography, as described in the examples of WO 98/03577 and WO 98/03756.

In general, the drying assistant is added to the dispersion in an amount of from 1 to 50% by weight, preferably from 2 to 30% by weight, and in particular from 5 to 20% by weight, based on the polymer P.

Suitable polymers for the polymer powders of the invention are essentially all film-forming polymers which form aqueous dispersions or may be prepared as an aqueous dispersion. They normally comprise polymers synthesized from ethylenically unsaturated monomers, for example:

(a) from 80 to 100% by weight of at least one monomer selected from vinylaromatic compounds, esters of α,β-monoethylenically unsaturated $C_3$–$C_6$ carboxylic acids and $C_1$–$C_{12}$ alkanols, preferably $C_1$–$C_8$ alkanols, vinyl esters and allyl esters of $C_1$–$C_{12}$ carboxylic acids, and conjugated $C_4$–$C_{10}$ diolefins, and (b) from 0 to 20% by weight of at least one other monomer containing at least one ethylenically unsaturated group.

All amounts specified for monomers are based on 100% by weight, i.e., on the total amount of the monomers to be polymerized.

Examples of vinylaromatic compounds are styrene, α-methylstyrene, $C_1$–$C_4$ alkylstyrenes such as o-vinyltoluene and tert-butylstyrene.

The esters of α,β-monoethylenically unsaturated carboxylic acids comprise, in particular, esters of acrylic acid and of methacrylic acid. Examples of such esters are methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, 2-ethylhexyl (meth)acrylate, n-decyl (meth)acrylate or dodecyl (meth)acrylate.

Vinyl esters and alkyl esters which may be used include vinyl acetate, vinyl propionate, vinyl n-butyrate, vinyl laurate and vinyl stearate, and the corresponding allyl esters.

Suitable conjugated $C_4$–$C_{10}$ diolefins are, for example, butadiene and isoprene.

Examples of the monomers (b) are:
ethylenically unsaturated monomers with an acid group, such as mono- and dicarboxylic acids having 3 to 8 carbon atoms, such as acrylic acid, methacrylic acid, crotonic acid, acrylamidoglycolic acid, vinylacetic acid, maleic acid, itaconic acid and the monoesters of maleic acid with $C_1$–$C_4$ alkanols, ethylenically unsaturated sulfonic acids such as vinylsulfonic acid, allylsulfonic acid, styrenesulfonic acid, 2-acrylamidomethylpropanesulfonic acid, and ethylenically unsaturated phosphonic acids, e.g., vinylphosphonic acid, allylphosphonic acid, styrenephosphonic acid and 2-acrylamido-2-methylpropanephosphonic acid, and their water-soluble salts, for example, their alkali metal salts, preferably acrylic acid and methacrylic acid. Such monomers may be present in the polymers P in an amount of up to 10% by weight, e.g., from 0.1 to 10% by weight, preferably from 0.1 to 4% by weight;

amides of ethylenically unsaturated carboxylic acids, such as acrylamide and methacrylamide, and also the N-alkylolamides, preferably the N-methylolamides of ethylenically unsaturated carboxylic acids, such as N-methylolacrylamide and N-methylolmethacrylamide. Such monomers may be present in the polymers P in an amount of up to 10% by weight, e.g., from 0.1 to 10% by weight, preferably from 0.1 to 4% by weight;

hydroxyalkyl esters of ethylenically unsaturated carboxylic acids, especially hydroxyethyl and hydroxypropyl esters, e.g., hydroxyethyl acrylate, hydroxypropyl acrylate, hydroxyethyl methacrylate and hydroxypropyl methacrylate. Such monomers may be present in the polymers P in an amount of up to 10% by weight, e.g., from 0.1 to 10% by weight, preferably from 0.5 to 5% by weight;

acrylonitrile and methacrylonitrile. Such monomers may be present in the polymers P in an amount of up to 10% by weight, e.g., from 0.5 to 10% by weight;

reactive monomers: the reactive monomers include those which have a reactive functionality suitable for crosslinking. Besides the abovementioned ethylenically unsaturated carboxylic acids, their N-alkylolamides and hydroxyalkyl esters, they include monomers having a carbonyl group or an epoxy group, examples being N-diacetonacrylamide, N-diacetomethacrylamide, acetylacetoxyethyl acrylate and acetylacetoxyethyl methacrylate, glycidyl acrylate and glycidyl methacrylate. Such monomers may be present in the polymers P in an amount of up to 10% by weight, e.g., from 0.5 to 10% by weight;

and crosslinking monomers. The crosslinking monomers include those which have at least two nonconjugated ethylenically unsaturated bonds, examples being the di- and triacrylates and methacrylates of di- and trifunctional alcohols, e.g., ethylene glycol diacrylate, diethylene glycol diacrylate, triethylene glycol diacrylate, butanediol diacrylate, hexanediol diacrylate, trimethylolpropane triacrylate and tripropylene glycol diacrylate. Such monomers may be present in the polymers P in an amount of up to 2% by weight, preferably not more than 1% by weight, e.g., from 0.01 to 2% by weight, preferably from 0.01 to 1% by weight. In one preferred embodiment the polymers P contain no copolymerized crosslinking monomer.

The process of the invention is preferably suitable for preparing polymer powders based on styrene-butadiene copolymers. The term copolymer in this context should not be interpreted restrictively and also embraces those polymers which contain other ethylenically unsaturated monomers copolymerized besides styrene and butadiene. Styrene-butadiene copolymers are generally synthesized from:

from 10 to 90% by weight, preferably from 20 to 80% by weight, in particular from 40 to 75% by weight, of styrene and, if desired, one or more other vinylaromatic monomers, from 10 to 90% by weight, preferably from 20 to 80% by weight, in particular from 25 to 60% by weight, of 1,3-butadiene, alone or in a mixture with another conjugated diolefin such as isoprene and, if desired, up to 20% by weight, preferably up to 10% by weight, e.g., from 0.1 to 20% by weight, preferably from 0.1 to 10% by weight, of one or more of the abovementioned monomers (b).

The weight ratio of vinylaromatic monomer(s) to butadiene is generally in the range from 1:9 to 9:1, in particular in the range from 4:1 to 1:4, and with very particular preference in the range from 3:1 to 1:1.

In one preferred embodiment of the present invention, the polymer P has been synthesized from:

from 20 to 80% by weight, in particular from 40 to 75% by weight, of styrene, from 20 to 80% by weight, in particular from 25 to 60% by weight, of butadiene, and, if desired, from 0.1 to 10% by weight, preferably from 0.1 to 5% by weight, of carboxyl-containing monomers, especially acrylic acid, methacrylic acid and/or itaconic acid.

The process of the invention is particularly suitable for preparing polymer powders where the polymer in the dispersion has a glass transition temperature (DSC, midpoint temperature, ASTM D 3418–82) which does not exceed 65° C., in particular 50° C., with particular preference 30° C. In general, the glass transition temperature of the polymers is at least −60° C., preferably at least −40° C., and in particular at least −20° C. The glass transition temperature of a polymer corresponds approximately to the minimum film-forming temperature or lies slightly above it.

In this context it is often useful to estimate the glass transition temperature $T_g$ of the dispersed polymer. According to Fox (T. G. Fox, Bull. Am. Phys. Soc. (Ser. II) 1, 123 [1956] and Ullmanns Encyklopädie der technischen Chemie, Weinheim (1980), p. 17, 18) the glass transition temperature of copolymers at high molar masses is given in good approximation by $$\frac{1}{T_g} = \frac{X^1}{T_g^1} + \frac{X^2}{T_g^2} + \ldots \frac{X^n}{T_g^n}$$

where $X^1, X^2, \ldots, X^n$ are the mass fractions 1, 2, ..., n and $T_g^1, T_g^2, \ldots, T_g^n$ the glass transition temperatures of the homopolymers of the monomers 1, 2, ..., n, in degrees Kelvin. The latter are known, for example, from Ullmann's Encyclopedia of Industrial Chemistry, VCH, Weinheim, Vol. A 21 (1992) p. 169 or from J. Brandrup, E. H. Immergut, Polymer Handbook 3$^{rd}$ ed., J. Wiley, New York 1989.

Preferred polymer dispersions are additionally those where the weight average diameter $d_w$ of the dispersed polymer particles is $\geq 100$ nm. Normally, the weight average diameter $d_w$ is $\geq 2000$ nm.

The $d_w$ of the particle size is normally defined as the weight average of the particle size as determined using an analytical ultracentrifuge in accordance with the method of W. Scholtan and H. Lange, Colloid-Z. and Z. Polymere 250 (1972) pages 782 to 796. The ultracentrifuge measurement gives the integral mass distribution of the particle diameter of a sample. From this it is possible to derive the percentage by weight of the particles having a diameter equal to or below a certain size.

The preparation of the polymer dispersions for drying is known and in the case of polymers synthesized from ethylenically unsaturated monomers generally takes place by means of a free radical aqueous emulsion polymerization, i.e., the monomers are polymerized in an aqueous emulsion in the presence of surface-active substances and at least one free radical initiator.

Suitable free radical initiators (addition polymerization initiators) are all those compounds capable of triggering a free radical aqueous emulsion polymerization. They include organic and inorganic peroxides and hydroperoxides, and azo compounds. Likewise suitable are redox initiator systems, which generally comprise a peroxide compound and a reducing agent, for example, ascorbic acid, hydroxymethanesulfinic acid, bisulfite-acetone adduct, sodium sulfite or sodium hydrogen sulfite, and/or a transition metal ion able to change its valence, in the form, for example, of water-soluble salts such as iron, vanadium or copper salts and water-soluble complexes thereof. Preferred initiator systems are the peroxides and hydroperoxides such as hydrogen peroxide, tert-butyl hydroperoxide, and isopropyl hydroperoxide. Further preferred initiators are the salts of peroxodisulfuric acid, especially its alkali metal salts (e.g., potassium and sodium salt) and/or its ammonium salts. Normally, the free radical initiator is used in an amount of from 0.1 to 3% by weight, based on the monomers to be polymerized.

Suitable surface-active substances include both protective colloids, i.e., water-soluble polymers having a molecular weight $M_n \geq 2000$, and the abovementioned anionic or neutral surface-active compounds (emulsifiers), which unlike the protective colloids generally have a molecular weight $M_n < 2000$ and in particular $<1000$. The surface-active substances are usually used in amounts of up to 10% by weight, preferably from 0.1 to 5% by weight, based on the monomers to be polymerized, with anionic emulsifiers (compounds AO) generally accounting for not more than 1% by weight, e.g., from 0.1 to 1% by weight, of the monomers to be polymerized.

Suitable protective colloids are polyvinyl alcohols, starch derivatives and cellulose derivatives, polyacrylic acids, copolymers of acrylic acid and of methacrylic acid with hydrophobic monomers and/or with hydroxyl-bearing monomers, polyacrylamide, or vinylpyrrolidone copolymers.

To adjust the molecular weight, small amounts, e.g., from 0.01 to 2% by weight, based on the monomers to be polymerized, of regulator substances may be used during the polymerization. Examples of suitable regulators are compounds containing a thiol group and/or a silane group (examples being t-dodecyl and n-dodecyl mercaptan or mercaptopropyltrimethoxysilane), allyl alcohols or aldehydes, such as formaldehyde, acetaldehyde and the like.

The emulsion polymerization may take place either continuously or by the batch method, preferably by a semicontinuous method. The monomers to be polymerized may be supplied continuously, including by a staged or gradient procedure, to the polymerization batch. For this purpose, the monomers may be supplied to the polymerization either as a monomer mixture or as an aqueous monomer emulsion.

In addition to the seed-free mode of preparation, a defined polymer particle size may be adjusted by conducting the emulsion polymerization by the seed latex method or in the presence of seed latex prepared in situ. Methods for this purpose are known and may be taken from the prior art (see EP-B 40419 and "Encyclopedia of Polymer Science and Technology", Vol. 5, John Wiley & Sons Inc., New York 1966, p. 847).

In one preferred embodiment of the present invention, the polymerization is conducted in the presence of from 0.01 to 3% by weight and in particular from 0.05 to 1.5% by weight of a seed latex (solids content of seed latex, based on total monomer amount), preferably with seed latex included in the initial charge (initial charge seed). The latex generally has a weight average particle size of from 10 to 400 nm, preferably from 20 to 120 nm, and in particular from 20 to 50 nm. Examples of its constituent monomers are styrene, methyl methacrylate, n-butyl acrylate and mixtures thereof, although the seed latex may also contain in copolymerized form minor amounts of ethylenically unsaturated carboxylic acids, such as acrylic acid and/or methacrylic acid and/or their amides, for example, preferably in an amount of not more than 10% by weight, based on the total weight of the polymer particles in the seed latex.

Polymerization pressure and polymerization temperature are of minor importance. In general, polymerization is operated at temperatures between room temperature and 120° C., preferably at temperatures from 40 to 110° C., and with particular preference from 50 to 100° C. at a pressure in the range from 1 to 10 bar.

Following the polymerization reaction proper it may be necessary to substantially free the aqueous polymer dispersions of the invention from odorous substances, such as residual monomers and other volatile organic constituents. This can be done conventionally by physical means, by distillative removal (especially via steam distillation) or by stripping with an inert gas. Moreover, the amount of residual monomers may be reduced chemically by free radical postpolymerization, especially under the action of redox initiator systems, as are recited, for example, in DE-A 44 35 423, DE-A 44 19 518 and DE-A 44 35 422. The postpolymerization is preferably conducted with a redox initiator system comprising at least one organic peroxide and an organic sulfite.

By this means it is possible to obtain polymer dispersions having polymer contents of up to 80% by weight, based on the total weight of the dispersion. In general, the solids content of the polymer dispersions thus prepared will be in the range from 40 to 60% by weight. The polymer dispersions obtainable in this way can then, where necessary, be adjusted to the solids content desired for drying, by dilution with an appropriate solvent, for example, with water or a water/emulsifier mixture, and/or by addition of an aqueous solution of the drying assistant.

The solids content of the polymer dispersion which is to be dried and which already contains the drying assistant is generally in the range from 10 to 60% by weight, preferably in the range from 20 to 55% by weight (calculated in each case as polymer+drying assistant, based on the total weight of the dispersion).

The evaporation of the volatile constituents from the aqueous polymer dispersion (sometimes referred to below as drying) takes place in a conventional manner, by freeze drying, for example, or, preferably, by spray drying.

In spray drying, the polymer dispersions to be dried are dried in the presence of the drying assistant in a drying tower through which a stream of hot air is passed. The temperature of the hot air stream is generally from 100 to 200° C. at the entry of the drying tower, preferably from 110 to 170° C., and from about 30 to 100° C. at the tower exit, preferably from 50 to 80° C. The polymer dispersion to be dried may be introduced counter to the stream of hot air or, preferably, may be introduced in parallel into the hot air stream. The addition may be made by way of single-fluid or multifluid nozzles or by way of a rotating disk. The polymer powders are separated off conventionally, using cyclones or filter separators, for example.

In principle, the drying agent T, i.e., the salts of arylsulfonic acid-formaldehyde condensates of the invention, and any other, prior art drying assistants used, examples being homopolymers and copolymers of vinylpyrrolidone, homopolymers and copolymers of acrylic acid and/or of methacrylic acid with hydroxyl-bearing monomers, vinylaromatic monomers, olefins and/or (meth)acrylic esters, polyvinyl alcohol, may be added to the polymer dispersion to be dried during the drying operation, in the form of solutions—as aqueous or aqueous-alcoholic solutions, for example. Preferably, the drying assistant is added to the polymer dispersion before the drying operation. The drying agent may be added to the dispersion either as a solid or, preferably, as a solution, e.g., as an aqueous-alcoholic solution or, in particular, as an aqueous solution. It is also possible to employ some of the suitable prior art drying assistants as protective colloids (see above) during the preparation of the aqueous polymer dispersion.

Furthermore, an anticaking agent may be added during the drying operation to the polymer dispersion that is to be dried. This anticaking agent is a finely divided inorganic oxide, such as a finely divided silica or a finely divided silicate, e.g., talc. The finely divided inorganic oxide preferably has an average particle size in the range from 0.01 to 0.5 $\mu$m. Particular preference is given to finely divided silica having an average particle size in the range from 0.01 to 0.5 $\mu$m, which may be either hydrophilic or hydrophobicized. The anticaking agent may be metered in before or during the drying of the polymer dispersion. In another embodiment, the anticaking agent is added to the polymer powder in a mixer suitable for solids, such as a shaker, roller bed screw mixer or the like.

Where desired, the anticaking agent will be used in an amount of from 0.5 to 15% by weight and, preferably, in an amount of from 2 to 12% by weight, based on the polymer powder (or on the sum of polymer P+drying assistant in the aqueous polymer dispersion).

The polymer powders obtained by the process of the invention are likewise provided by the present invention. In the presence of water, e.g., aqueous redispersed preparations of the polymer powders are notable for an improved film-forming ability. Surprisingly, the process of the invention also leads to better results in the case of spray drying—for example, to increased powder yield and to reduced deposit formation—than when using dispersions containing less than 1.5% by weight of anionic surface-active compounds AO. Surprisingly, other performance properties are not adversely affected.

The polymer powders obtained by the process of the invention comprise i at least one film-forming polymer P, ii from 1 to 50% by weight, based on the polymer P, of at least one drying assistant T, iii at least 1.5% by weight, based on the polymer P, of at least one anionic surface-active compound AO, iv if desired, neutral surface-active compounds in an amount of up to 10% by weight, based on the polymer P, and v if desired, fillers, pigments, anticaking agents and/or customary auxiliaries, e.g., prior art drying assistants, biocides and/or defoamers.

The polymer powders of the invention are suitable as cobinders in binding mineral building materials and ready-to-use binding building material formulations, as binders in paints, varnishes, adhesives, coating compositions, sealants, building adhesives, e.g., flooring adhesives and especially tile adhesives, and in synthetic resin plasters.

In particular, the polymer powders obtainable in accordance with the invention are suitable as cobinders in binding mineral building materials and in ready-to-use formulations of these building materials, and also in building adhesives. These compositions are likewise provided by the present invention.

By binding mineral building materials and their formulations are meant compositions which comprise at least one mineral binder such as lime, gypsum, clay and/or cement together if appropriate with mineral aggregates. The ready-to-use formulation is converted into the actual building material formulation by stirring with water, and this latter formulation, when left to itself, solidifies to a stonelike mass in air or else under water, with or without exposure to elevated temperature. Besides the mineral aggregates, mineral building material formulations also include customary auxiliaries, examples being thickeners or plasticizers and defoamers, depending on the end use.

Preferred mineral binders contain from 70 to 100% by weight of cement and from 0 to 30% by weight of gypsum. In particular, cement is the sole mineral binder. The activity according to the invention is essentially independent of the type of cement. Depending on the project at hand, therefore, it is possible to use blast furnace slag cement, oil shale cement, Portland cement, hydrophobicized Portland cement, quick-setting cement, high-expansion cement or high-alumina cement, the use of Portland cement proving particularly favorable.

The dry compositions of binding mineral building materials typically include, based on the amount of mineral binder, from 0.1 to 20% by weight, in particular from 0.5 to 10% by weight, of modifying polymer powder. The weight ratio of polymer to mineral binder is generally in the range from 1:100 to 1:1.

Cellulose derivatives and microsilica are frequently added to the binding mineral building materials in order to improve their processing properties. The former additives usually have a thickening action, while the latter normally constitute thixotropic agents which bring about a further reduction in the flowability of the aqueous mortar prior to its solidification in the applied, at-rest state. By adding defoamers (preferably in powder form in the context of dry mortars), it is possible in the solidified state to obtain a solidified cementitious mortar with an air pore content appropriate to the field of use (from 5 to 20% by volume).

Sand, e.g., quartz sand, and, if desired, fillers such as calcium carbonate and pigments such as titanium dioxide or iron oxide, natural and synthetic fibers generally form the remaining aggregates.

Building adhesives embrace, for example, flooring adhesives and tile adhesives. As the adhesive component they comprise at least one polymer powder of the invention and also, depending on the nature of the formulation, plasticizers, fillers, dispersing assistants, biocides, and also, if desired, water, defoamers, thickeners, thixotropic agents, and other additives. In one preferred embodiment, they also comprise a mineral binder, e.g., cement. Such formulations are used in particular as tile adhesives. Owing to the mineral binder, they are likewise included under the binding mineral building materials.

Typical binding mineral building materials and other building adhesives such as tile adhesives, especially in the form of a binding mineral building material dry formulation, contain (based on the total weight of the solids they comprise):

from 10 to 60, preferably from 15 to 50% by weight of mineral binder (preferably exclusively cement, especially Portland cement)

from 0.1 to 20, frequently from 0.2 to 15% by weight, in particular from 0.5 to 10% by weight, especially from 2 to 8% by weight, of polymer powders of the invention, up to 25% by weight of conventional assistants, e.g., defoamers, thickeners, plasticizers and thixotropic agents, with the remainder comprising from 30 to 80% by weight of aggregates, e.g., sand, fillers (e.g. $CaCO_3$), pigments (e.g., $TiO_2$), and natural and/or synthetic fibers. Defoamers are used generally in an amount of from 0.1 to 2% by weight, thixotropic agents up to 2% by weight, plasticizers up to 1% by weight.

Typical embodiments of binding mineral building material formulations are cementitious repair mortars or reinforcing mortars. Customary reinforcing mortars have their crack bridging capabilities enhanced by the presence of natural or synthetic fibers of materials such as dralon (length for example from 1 to 10 mm, linear density for example from 3 to 10 dtex) in an amount of up to 10% by weight. An overview of auxiliaries and aggregates is given by H. Reul in Handbuch der Bauchemie, Verlag für chemische Industrie, H.Zielkowsky KG, Augsburg, 1991.

Another preferred embodiment of binding mineral building material formulations comprises tile adhesives. Typical tile adhesives, as a dry formulation, comprise the polymer powder, which based on 100% by weight dry formulation generally makes up from 0.5 to 10% by weight, in particular from 2 to 8% by weight, plus from 15 to 50% by weight of mineral binder, especially cement, from 30 to 80% by weight of aggregates customary for the purpose, especially quartz sand, with a sieve line of 0.063–0.4 mm, for example, and/or calcium carbonate, and also customary assistants such as thickeners, defoamers, biocides, dispersing assistants, plasticizers, film-forming assistants, etc., in an amount of from 0.1 to 25% by weight.

The examples which follow illustrate the invention without restricting it.

I Materials Used

Polymer dispersion D1: Aqueous styrene-butadiene dispersion containing 50% by weight of polymer having a glass transition temperature $T_g$ of 4° C., containing 52.3% by weight styrene, 43.2% by weight butadiene and 4.5% by weight acrylic acid in copolymerized form and stabilized with 0.5% by weight, based on the polymer, of a nonionic emulsifier ($C_{12}$ alkanol ethoxylate having a degree of ethoxylation of 2–3).

Polymer dispersion D2: Aqueous styrene-butadiene dispersion containing about 50% by weight of polymer containing 42% by weight butadiene, 53% by weight styrene, 4.5% by weight acrylic acid and 0.5% by weight itaconic acid in copolymerized form and stabilized with 0.5% by weight, based on the polymer, of an anionic emulsifier (sodium salt of a sulfuric acid monoester of an ethoxylated $C_{12}$ alkanol having from 2 to 3 ethylene oxide units) and in which the polymer particle size ($d_{50}$) was 130 nm and the polymer of the dispersion had a glass transition temperature of approximately 5° C.

Drying assistant T1: naphthalenesulfonic acid-formaldehyde condensate, as calcium salt, prepared according to Example 2.1 (spraying assistant S1) of WO 98/03577.

Anionic emulsifier AO 1: $C_{12}$ alkylphenylsulfonic acid sodium salt as a 15% strength by weight aqueous solution.

AO2: Sodium salt of bis-2-ethylhexyl ester of sulfosuccinic acid as a 60% strength by weight aqueous solution.

AO3: Sodium salt of a $C_{10-18}$ alkylsulfonate as a 28% strength by weight aqueous solution.

Nonionic emulsifer NO 1: $C_{16}$ alkanol ethoxylate having a degree of ethoxylation of 18, as a 28% strength by weight aqueous solution.

II Preparation of the Polymer Powders

General Preparation Procedure:

The polymer powders were prepared by spray drying. For this purpose, 10 parts by weight of drying assistant T1 and, if appropriate, emulsifier solution in accordance with the details in Table 1 were added to the dispersion D1 and a solids content of 30% by weight was established using water.

Spray drying was conducted in a Minor laboratory dryer from GEA Wiegand GmbH (Niro division) with dual-fluid nozzle atomization (Teflon dual-fluid nozzle, opening: 1.3 mm). The temperature of the hot air stream at the tower entrance was about 130° C. and at the tower exit was about 60° C. The drying output was 2 kg spray feed/h, with 120 g/h of a finely divided silica being metered as an anticaking agent into the drying chamber simultaneously with the spray feed. The spray drying results are summarized in Table 1.

III. Performance Testing

Redispersibility: 30 g of the polymer powder prepared in accordance with II were dispersed in 70 ml of deionized water in a measuring cylinder and left at room temperature for 4 hours, after which a visual assessment was made of the extent to which the polymer phase had separated by settling from the aqueous phase. The results are compiled in Table 1.

Filming: A polymer film was cast from the redispersed dispersions and then dried at room temperature for 4 days. The quality of the film was assessed visually as stated in Table 1.

TABLE 1

| | | AO | | NO1[3] | Spray | | |
|---|---|---|---|---|---|---|---|
| Example | Dispersion | Type | [% by wt.] | [% by wt] | drying[4] | Filming[5] | Redispersibility[6] |
| V1 [1] | D1 | AO1 | 0 | 0 | + | --- | o |
| V2 | D1 | AO1 | 0 | 2 | + | --- | o |
| V3 | D1 | AO1 | 0.5 | 0 | + | -- | o |
| 4 | D1 | AO1 | 2 | 0 | +++ | +++ | + |
| V5 | D1 | AO1 | 1 | 0.5 | + | -- | o |
| 6 | D2 | AO2 | 2.5 | 0 | +++ | +++ | + |

TABLE 1-continued

| Example | Dispersion | AO Type | AO [% by wt.] | NO1[3] [% by wt] | Spray drying[4] | Filming[5] | Redispersibility[6] |
|---|---|---|---|---|---|---|---|
| 7 | D2 | AO1 | 2.5 | 0 | +++ | +++ | + |
| 8 | D2 | AO3 | 2.5 | 0 | +++ | +++ | + |

[1])V = Comparative example
[2])Anionic emulsifier AO1, calculated as solid, based on polymer.
[3])Nonionic emulsifier NO1, calculated as solid, based on polymer.
[4])
+   yield > 60%;
++  yield > 75%;
+++ yield >90%.
[5])
---   no coherent film;
--    completely cracked;
-     shrinkage cracks over large surface area;
+     shrinkage cracks at edge;
++    filmed with scars;
+++   flawless elastic film.
[6])
-   copious sediment, clear phase separation;
o   sediment;
+   no sediment.

We claim:

1. A process for preparing polymer powders by evaporating the volatile constituents from an aqueous dispersion of a film-forming polymer P in the presence of a drying assistant T selected from the salts of oligomeric arylsulfonic acid-formaldehyde condensates wherein prior to the evaporation of the volatile constituents the aqueous polymer dispersion comprises at least 1.5% by weight based on the polymer in the dispersion, of at least one anionic surface-active compound AO having at least one $C_6$–$C_{32}$ alkyl group.

2. A process as claimed in claim 1, wherein the total amount of anionic surface-active compound AO is in the range from 1.5 to 4% by weight, based on the polymer in the dispersion.

3. A process as claimed in claim 1 or claim 2, wherein the anionic surface-active compound AO has at least one sulfonate group.

4. A process as claimed in claim 3, wherein the anionic surface-active compound AO is selected from compounds of the formula I

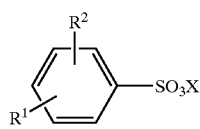

(I)

in which
  $R^1$ is a $C_6$–$C_{32}$ alkyl group,
  $R^2$ is hydrogen, $C_1$–$C_4$ alkyl, a fused benzene ring unsubstituted or substituted by $C_1$–$C_4$ alkyl, or is a phenoxy radical with or without a $C_6$–$C_{32}$ alkyl group and/or a sulfonate group, and
  X is a cation equivalent.

5. A process as claimed in claim 3, wherein the anionic surface-active compound AO is selected from $C_6$–$C_{32}$ alkyl sulfonates.

6. A process as claimed in claim 3, wherein the anionic surface-active compound is selected from the salts of di($C_6$–$C_{32}$ alkyl) esters of sulfonated saturated dicarboxylic acids having 3 to 10 carbon atoms.

7. A process as claimed in claim 1, wherein the drying assistant is selected from phenolsulfonic acid-formaldehyde condensates or naphthalenesulfonic acid-formaldehyde condensates having a number average molecular weight $M_n$ of less than 1500 daltons.

8. A process as claimed in claim 1, wherein the polymer dispersion comprises the drying assistant T in an amount of from 1 to 50% by weight, based on the polymer.

9. A process as claimed in claim 1, wherein the polymer in the dispersion is a styrene-butadiene copolymer.

10. A process as claimed in claim 1, wherein the polymer in the dispersion has a glass transition temperature $T_g$ of less than 65° C.

11. A process as claimed in claim 1, wherein the polymer dispersion further comprises at least one nonionic emulsifier in an amount of up to 10% by weight, based on the polymer.

12. A process as claimed in claim 1, wherein the volatile constituents are evaporated from the aqueous polymer dispersion by a spray drying process.

13. A polymer powder prepared by the process as claimed in claim 1.

14. A polymer powder prepared by the process of claim 11, comprising
  (i) at least one film-forming polymer P,
  (ii) from 1 to 50% by weight, based on the polymer P, of at least one drying assistant T,
  (iii) at least 1.5% by weight, based on the polymer P, of at least one anionic surface-active compound AO,
  (iv) a nonionic emulsifier in an amount of up to 10% by weight, based on the polymer P, and
  (v) optionally, a filler, pigment, an anticaking agent and/or a customary auxiliary.

15. A binding mineral building material comprising at least one polymer powder as claimed in either of claims 13 and 14.

16. A binding mineral building material as claimed in claim 15 in the form of a dry mortar formulation comprising
  from 10 to 60% by weight of mineral binder,
  from 0.1 to 20% by weight of said polymer powder,
  up to 25% by weight of a customary auxiliary for binding mineral building materials, and
  as the remainder, an aggregate.

17. A binding mineral building material as claimed in claim 15 in the form of a dry building adhesive formulation comprising
  from 15 to 50% by weight of mineral binder
  from 0.5 to 10% by weight of said polymer powder
  from 0.1 to 25% by weight of an assistant customary for building adhesives from 30 to 80% by weight of aggregates customary for building adhesives.

18. A composition selected from the group consisting of binding mineral building material and ready-to-use bind building material formulation comprising as a cobinder a polymer powder as claimed in claim 13 or claim 14.

19. A composition selected from the group consisting of paints, varnishes, adhesives, coating compositions, sealants, building adhesives, and synthetic resin plasters comprising, as a binder, a polymer powder as claimed in claim 13 or claim 14.

20. A process as claimed in claim 3, wherein the anionic surface-active compound AO is selected from (I) compound of the formula I

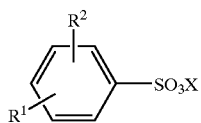

in which
- $R_1$ is a $C_6$–$C_{32}$ alkyl group,
- $R_2$ is hydrogen, $C_1$–$C_4$ alkyl, a fused benzene ring unsubstituted or substituted by $C_1$–$C_4$ alkyl, or is a phenoxy radical with or without a $C_6$–$C_{32}$ alkyl group and/or a sulfonate group, and
- X is a cation equivalent, or from (II) the salts of di($C_6$–$C_{32}$ alkyl) esters of sulfonated saturated dicarboxylic acids having 3 to 10 carbon atoms.

21. A process as claimed in claim 20, wherein the drying assistant is selected from phenolsulfonic acid-formaldehyde condensates or naphthalenesulfonic acid-formaldehyde condensates having a number average molecular weight $M_n$ of less than 1500 daltons.

22. A process as claimed in claim 21, wherein the polymer dispersion comprises the drying assistant T in an amount of from 1 to 50% by weight, based on the polymer.

23. A process as claimed in claim 22, wherein the polymer in the dispersion is a styrene-butadiene copolymer.

24. A process as claimed in claim 22, wherein the polymer in the dispersion has a glass transition temperature $T_g$ of less than 65° C.

25. A process as claimed in claim 24, wherein the polymer in the dispersion further comprises at least one nonionic emulsifier in an amount of up to 10% by weight, based on the polymer.

26. A process as claimed in claim 25, wherein the volatile constituents are evaporated from the aqueous polymer dispersion by a spray drying process.

27. A polymer powder prepared by the process as claimed in claim 3.

28. A polymer powder prepared by the process of claim 25, comprising
  (i) at least one film-forming polymer P,
  (ii) from 1 to 50% by weight, based on the polymer P, of at least one drying assistant T,
  (iii) at least 1.5% by weight, based on the polymer P, of at least one anionic surface-active compound AO,
  (iv) a nonionic emulsifier in an amount of up to 10% by weight, based on the polymer P, and
  (v) optionally, a filler, a pigment, an anticaking agent and/or a customary auxiliary.

29. A binding building material comprising at least one polymer powder as claimed in either of claims 27 and 28.

30. A binding mineral building material as claimed in claim 29 in the form of a dry mortar formulation comprising
  from 10 to 60% by weight of mineral binder,
  from 0.1 to 20% by weight of said polymer powder,
  up to 25% by weight of a customary auxiliary for binding mineral building materials, and
  as the remainder an aggregate.

31. A binding mineral building material as claimed in claim 29 in the form of a dry building adhesive formulation comprising
  from 15 to 50% by weight of mineral binder
  from 0.5 to 10% by weight of said polymer powder
  from 0.1 to 25% by weight of an assistant customary for building adhesives
  from 30 to 80% by weight of an aggregate customary for building adhesives.

32. The polymer powder produced by the process of claim 12 or of claim 26.

33. The polymer powder of claim 32, wherein the polymer is a polymer of an ethylenically-unsaturated monomer.

34. The polymer powder of claim 33, wherein the total amount of anionic surface-active compound AO is in the range from 1.5 to 4% by weight based on the polymer.

* * * * *